United States Patent
Manna et al.

(10) Patent No.: US 7,574,140 B2
(45) Date of Patent: Aug. 11, 2009

(54) OPTICAL TRANSMISSION SYSTEM INCLUDING REPEATERED AND UNREPEATERED SEGMENTS

(75) Inventors: Massimo Manna, Eatontown, NJ (US); Ekaterina A. Golovchenko, Colts Neck, NJ (US); Mark Enright, Hampton, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 481 days.

(21) Appl. No.: 11/021,726

(22) Filed: Dec. 22, 2004

(65) Prior Publication Data

US 2006/0133822 A1    Jun. 22, 2006

(51) Int. Cl.
*H04B 10/16* (2006.01)
(52) U.S. Cl. .................... 398/105; 398/173
(58) Field of Classification Search ............. 398/105, 398/173, 104
See application file for complete search history.

(56) References Cited

U.S. PATENT DOCUMENTS

| | | | | |
|---|---|---|---|---|
| 5,526,157 | A * | 6/1996 | Kawano ................ | 398/1 |
| 6,038,356 | A | 3/2000 | Kerfoot, III et al. | |
| 6,108,468 | A * | 8/2000 | Kaneko et al. ............ | 385/24 |
| 6,166,836 | A | 12/2000 | Crameri et al. | |
| 6,236,776 | B1 * | 5/2001 | Sakuyama ................ | 385/24 |
| 6,327,060 | B1 * | 12/2001 | Otani et al. .............. | 398/83 |
| 6,344,923 | B1 | 2/2002 | Blondel et al. | |
| 6,377,373 | B1 * | 4/2002 | Kawazawa et al. ......... | 398/82 |
| 6,507,431 | B1 * | 1/2003 | Sugaya et al. .......... | 359/341.32 |
| 6,678,087 | B1 * | 1/2004 | Masuda et al. .............. | 359/334 |
| 6,775,479 | B2 | 8/2004 | Milton et al. | |
| 6,879,434 | B2 | 4/2005 | Aoki et al. | |
| 6,934,442 | B2 | 8/2005 | Nagel et al. | |
| 7,146,071 | B2 | 12/2006 | Yokota | |
| 2002/0057477 | A1 | 5/2002 | Rocca et al. | |
| 2002/0080447 | A1 | 6/2002 | Fells et al. | |
| 2003/0072062 | A1 | 4/2003 | Pedersen et al. | |
| 2004/0036959 | A1 | 2/2004 | Evangelides, Jr. et al. | |
| 2004/0151510 | A1 * | 8/2004 | Tanaka et al. .............. | 398/147 |
| 2004/0196532 | A1 | 10/2004 | Evangelides, Jr. et al. | |
| 2005/0025501 | A1 * | 2/2005 | Bickham .................. | 398/188 |
| 2005/0213980 | A1 * | 9/2005 | Ota ....................... | 398/84 |
| 2005/0259990 | A1 * | 11/2005 | Yokota .................... | 398/92 |
| 2006/0133808 | A1 | 6/2006 | Evangelides, Jr. et al. | |

FOREIGN PATENT DOCUMENTS

| | | |
|---|---|---|
| EP | 1005183 | 5/2000 |
| JP | 8056195 | 2/1996 |

OTHER PUBLICATIONS

Nagel, et al., "A Hybrid Undersea System and Design for Regional Applications" Poster We 8.7, Suboptic 2004 (3 pages).
International Search Report and Written Opinion mailed on Sep. 13, 2007 in correspondence PCT Application Serial No. PCT/US05/46314.

* cited by examiner

*Primary Examiner*—Leslie Pascal
(74) *Attorney, Agent, or Firm*—Grossman, Tucker, Perreault & Pfleger, PLLC

(57) ABSTRACT

A communication system including a repeatered trunk path and one or more unrepeatered branch segments coupled to the trunk path through associated submarine branching units. Each of the branch segments may be configured to carry at least the same channel capacity as the trunk path and may have a length greater than the average repeater spacing in the trunk path.

25 Claims, 3 Drawing Sheets

OPTICAL TRANSMISSION SYSTEM INCLUDING REPEATERED AND UNREPEATERED SEGMENTS

TECHNICAL FIELD

The present application relates to the optical transmission of information and, more particularly, to an optical transmission system including repeatered and unrepeatered segments.

BACKGROUND

Undersea optical fiber communication systems typically include optical fiber cables laid along the ocean floor, sometimes for hundreds or thousands of kilometers. Such systems may include a main trunk path extending between remote cable stations. The trunk path may include numerous coupled optical fiber cables, one or more repeaters, e.g. optical amplifier repeaters, and other optical/electrical equipment. At each end of the trunk path, the optical fiber cable extends out of the ocean, onto land, and eventually into a cable station. The cable station may be configured for transmitting and receiving optical signals along the path and to/from other destinations using terrestrial communications networks.

Such undersea systems may also include one or more branch segments coupled to the trunk path by a submarine branching unit. A branch segment typically includes a plurality of coupled optical fiber cables and one or more repeaters, and extends from the branching unit, onto land, and to an associated branch segment cable station. The branch segment cable station may be configured for transmitting and receiving signals along the branch segment and to/from other destinations using terrestrial communications networks.

The optical repeaters coupled along the trunk path and branch segments receive incoming wavelengths of light from the optical cables coupled thereto, amplify the light using, for example, erbium doped fiber and an optical pump, and then transmit the amplified light on the next section of optical cable in the segment. Numerous optical repeater configurations are known to those skilled in the art. Such optical repeaters require electrical power to operate, but are not typically located near a power source. As such, electrical power is provided to each of the repeaters via the power conductor of the optical fiber cable connected thereto.

All of the repeaters in a segment may be powered in series by a current supplied on the power conductors of the cables forming the segment. The current supplied on the cable power conductors is provided by power feed equipment (PFE) located at a cable station. For the trunk path, the cable power conductor may be connected to a positive PFE terminal at one cable station and to a negative PFE terminal at the cable station at the opposite end of the path. For a branch segment, the cable power conductor may be connected to a negative PFE terminal at the cable station coupled to the end of the branch segment and may be connected to a positive PFE terminal of one of the trunk path cable stations through connections in the branching unit.

Conventional configurations require PFE at each cable station associated with the trunk path and each branch segment for providing electrical power to repeaters within the path/segments. Each trunk path and segment is installed having the necessary PFE and repeaters to sustain communications between the cable stations connected thereto. The high cost of installing and operating trunk paths and segments including such equipment can limit the number and configuration of the path/segments for a particular system. Accordingly, there is a need for a configuration, method and system which reduces the cost of undersea communication systems.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
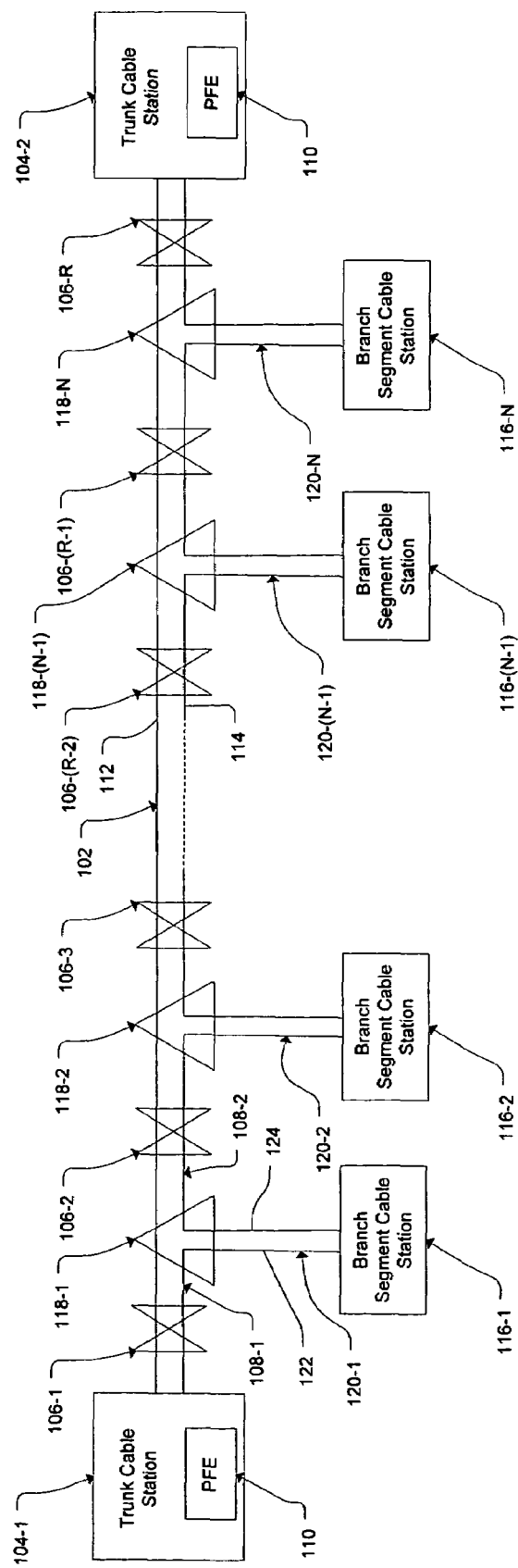
FIG. 1 is a simplified block diagram of one exemplary embodiment of a system consistent with the invention.

FIG. 1 is a simplified block diagram of one exemplary embodiment of a system 100 consistent with the present invention. The illustrated system serves to transmit a plurality of optical data signals, each at different associated wavelength, between cable stations. A trunk path 102 is provided from trunk cable station 104-1 to trunk cable station 104-2. The trunk path 102 may include a plurality of coupled optical fiber cable segments, e.g. 108-1, 108-2, and a plurality of repeaters 106-1 ... 106-R and other optical/electrical equipment disposed along the length thereof. A variety of configurations for repeaters and optical/electrical equipment for use in a trunk path are known to those of ordinary skill in the art. Also, those of ordinary skill in the art will recognize that the specific configuration of the trunk path 102, the repeaters 106-1 ... 106-R, and other optical/electrical equipment may vary depending upon the length of the trunk path, the non-linearities associated with the path and the performance requirements of the system.

The optical fiber cables forming the trunk path may be conventional optical fiber cables including a plurality of optical fiber pairs for carrying data signals bi-directionally on the trunk path. The cables may also include a power conductor for carrying electrical power from PFE 110 in the cable stations 104-1 and 104-2 to the repeaters 106-1 ... 106-R and other optical/electrical equipment on the path. A first transmit/receive fiber pair 112 of the trunk path may couple cable station 104-1 to cable station 104-2 and a second fiber pair 114 of the path may be coupled to one or more branch segment cable stations 116-1 ... 106-N via associated branching units 118-1 ... 118-N and branch segments 120-1 ... 120-N. A variety of configurations of branching units are known to those skilled in the art.

Each branch segment 120-1 ... 120-N may include an optical fiber cable having a first fiber pair (e.g. 122) coupled to a first segment (e.g. 108-1) of the trunk path through the branching unit and a second fiber pair (e.g. 124) coupled to another segment (e.g. 108-2) of the trunk path through its associated branching unit. The fiber pairs coupled to the branching unit may carry at least the same channel capacity as the trunk path 102 (as opposed to only a subset of add/drop channels). Each branch segment 120-1 ... 120-N may thus allow full channel capacity communication between its associated branch segment cable station 116-1 ... 116-N and the other cable stations coupled to the trunk path.

The cable stations 104-1, 104-2, and 116-1 . . . 116-N are shown in highly simplified form for ease of explanation. Each cable station may include a transceiver configured for transmitting and receiving optical data signals on the cable segments coupled to the station. Each transceiver may include electrical and optical components configured for transmitting and receiving the data signals at associated wavelength with an associated amplitude and modulation.

Consistent with the present invention, the trunk path 102 may be a repeatered path, i.e. including repeaters 106-1 . . . 106-R spaced along the length thereof, whereas one or more of the branch segments 120-1 . . . 120-N are unrepeatered, i.e. no repeater is coupled along the length of the branch segment. The trunk path 102 may extend for several thousand kilometers with the repeaters 106-1 . . . 106-R being spaced and powered by PFE 110 in cable stations 104-1, 104-2. Each of the repeaters 106-1 . . . 106-R may be spaced at a predetermined nominal spacing or at different repeater spacings. The repeater spacing depends on several factors known to those of ordinary skill in the art including the repeater configuration, and the length and performance requirements of the trunk path. By way of example only, the average repeater spacing for trunk paths having a length between about 500 km and 13000 km may be between about 35 km and 120 km. Other repeater spacings are possible.

Each unrepeatered branch segment 120-1 . . . 120-N consistent with the invention may have a length greater than the average repeater spacing of the trunk path 102 by providing optical amplification in the segment without use of a repeater. Significant cost savings are realized by omission of a repeater in the branch segments 120-1 . . . 120-N and PFE in the associated branch segment cable stations 116-1 . . . 116-N. The ultimate capacity of a system 100 consistent with the invention is unchanged compared to a system including repeatered branch segments, and the length of the branch segments 120-1 . . . 120-N may be longer than the average repeater spacing in the trunk path (i.e., longer than the predetermined nominal spacing or longer than the average of multiple different repeater spacings).

In one embodiment consistent with the invention, the length of an unrepeatered branch segment, i.e. from the branch segment cable station to the branching unit, may be increased to between one to three times the average repeater spacing in the trunk path 102 through application of Raman amplification in the branch segment such that the branch segment acts as an optically distributed amplifier. As is known to those of ordinary skill in the art, Raman amplification occurs throughout an optical transmission fiber when the transmission fiber is pumped at an appropriate wavelength or wavelengths. Gain is then achieved at a longer wavelength through the process of Stimulated Raman Scattering. The difference between the Raman amplifier pumped wavelength and the peak of the associated amplified wavelength spectrum at the longer wavelength is referred to as a "Stokes shift." The Stokes shift for a typical silica fiber is approximately 13 THz.

Figure 2:
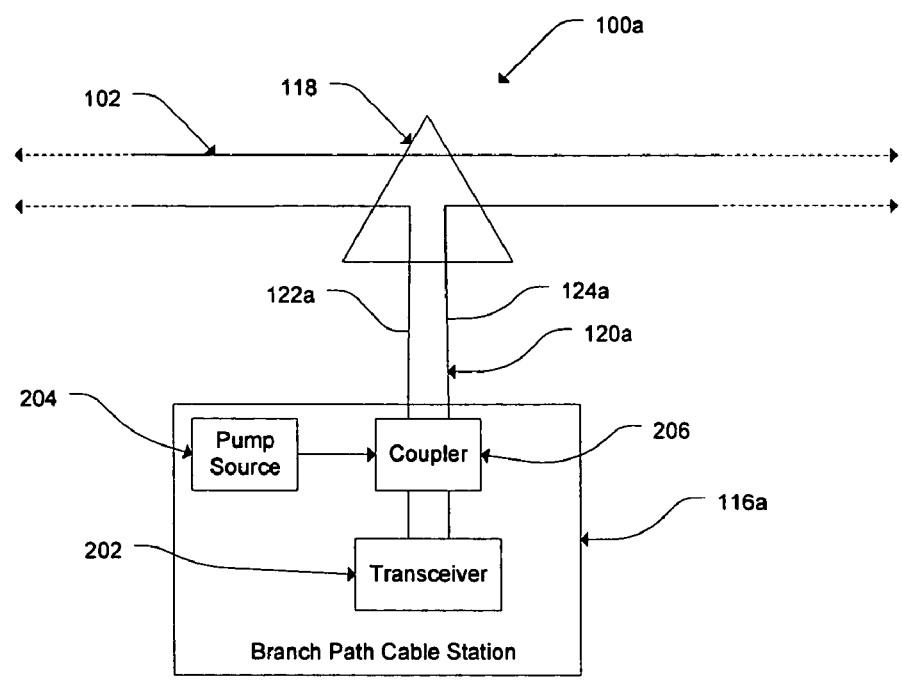
FIG. 2 is a block diagram of one exemplary embodiment of portion of a system including an unrepeatered branch segment consistent with the present invention.

FIG. 2 illustrates a portion of a system 100*a* consistent with the invention including a branch segment cable station 116*a* configured for establishing Raman amplification in an unrepeatered branch segment 120*a*. In the illustrated exemplary embodiment, the cable station 116*a* includes a transceiver 202 coupled to separate fiber pairs 122*a*, 124*a* along with a pump source 204 coupled to establish Raman amplification along each fiber of the fiber pairs 122*a*, 124*a*. For ease of explanation, the cable station 116*a* is shown in highly simplified form with a single transceiver 202 along with a single pump source 204 coupled to both of the illustrated fiber pairs 122*a*, 124*a*. Those skilled in the art will recognize that separate transceivers may be provided for separate fiber pairs, and that separate pump sources may be provided for each fiber. Also, the pump source 204 may be provided as part of the transceiver 202 or separate therefrom. In one embodiment, the transceiver 202 may be configured to transmit optical data signals on the fibers of the segment 120*a* at an increased power compared to the transmitted power from the trunk path cable stations (e.g. 104-1, 104-2).

In the illustrated exemplary embodiment, the pump source 204 is coupled to branch segment 120*a* through an associated coupler configuration 206. The pump source 204 may include a plurality of pumps provided in a wide variety of configurations, e.g. for pumping the fibers 122*a*, 124*a* in the branch segment 120*a* at between about 1440 nm and 1500 nm to cause Raman amplification of optical channels in the 1550 nm range. A number of pump source configurations are known to those skilled in the art, including, for example, laser pump sources. The coupler configuration 206 may include a separate coupler associated with each optical fiber to inject an associated pump wavelength or plurality of pump wavelengths on the fiber. A variety of couplers for combining the pump powers and injecting the pump power at different wavelengths into fibers of the fiber pairs 122*a*, 124*a* are also known, e.g. optical couplers or a pump multiplexer.

Figure 3:
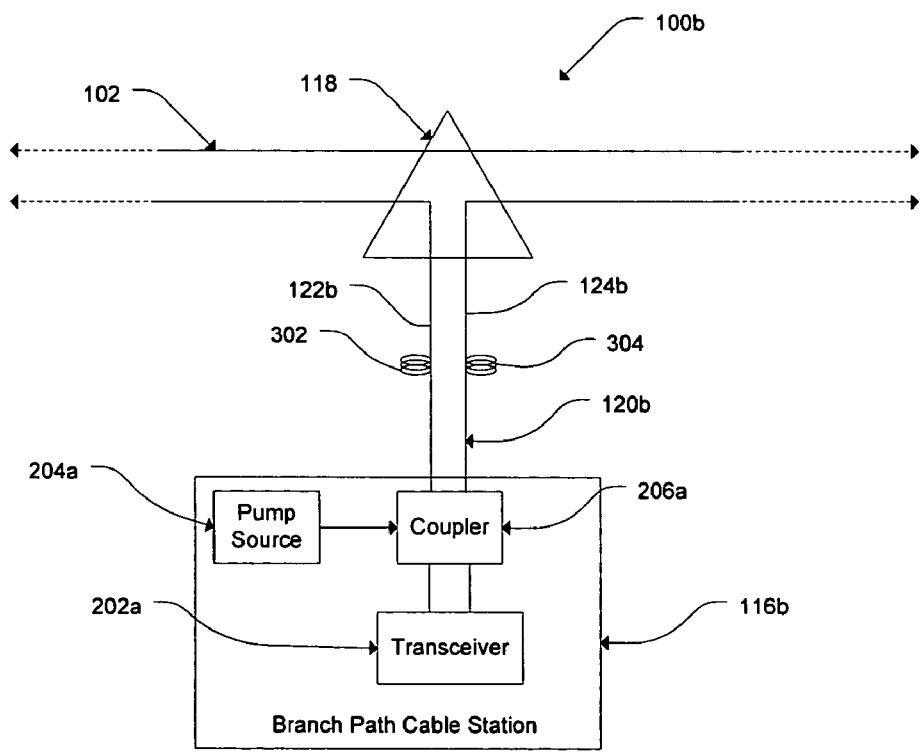
FIG. 3 is a block diagram of another exemplary embodiment of a portion of a system including an unrepeatered branch segment consistent with the present invention.

In another embodiment consistent with the invention, the length of a branch segment can be increased relative to an embodiment including Raman amplification, e.g. as shown in FIG. 2, by combining Raman amplification with amplification from a rare earth doped fiber, e.g. an erbium doped fiber. FIG. 3 illustrates a portion of a system 100*b* consistent with the invention including a branch segment 120*b* consistent with the invention wherein a segment of rare earth doped fiber is provided in the paths between the cable station 116*b* and the branching unit 118. For ease of explanation, single doped fiber segments 302, 304 are shown for each fiber pair 122*b*, 124*b*. Those of ordinary skill in the art will recognize that a single rare earth fiber segment may be provided for each fiber.

The cable station 116*b* may include a pump source 204*a* and coupler 206*a* for establishing Raman amplification in the fiber pairs 122*b*, 124*b*, e.g. as described in connection with FIG. 2. The rare earth doped fiber segments 302, 304 may be erbium doped fiber segments, and the pump source 204*a* may include one or more pumps for pumping the fiber segments 302, 304 at a wavelength(s) to establish an erbium doped fiber amplifier (EDFA). Although the pump source 204*a* in the illustrated embodiment is described as including pumps for pumping the doped fiber segments 302, 304 and pumps for establishing Raman amplification, the pumps may be provided as separate components and separately coupled to the fibers through associated couplers. Also, the fiber segments 302, 304 may be pumped through the same fiber on which the optical data signals travel or through a dedicated optical fiber path.

Figure 4:
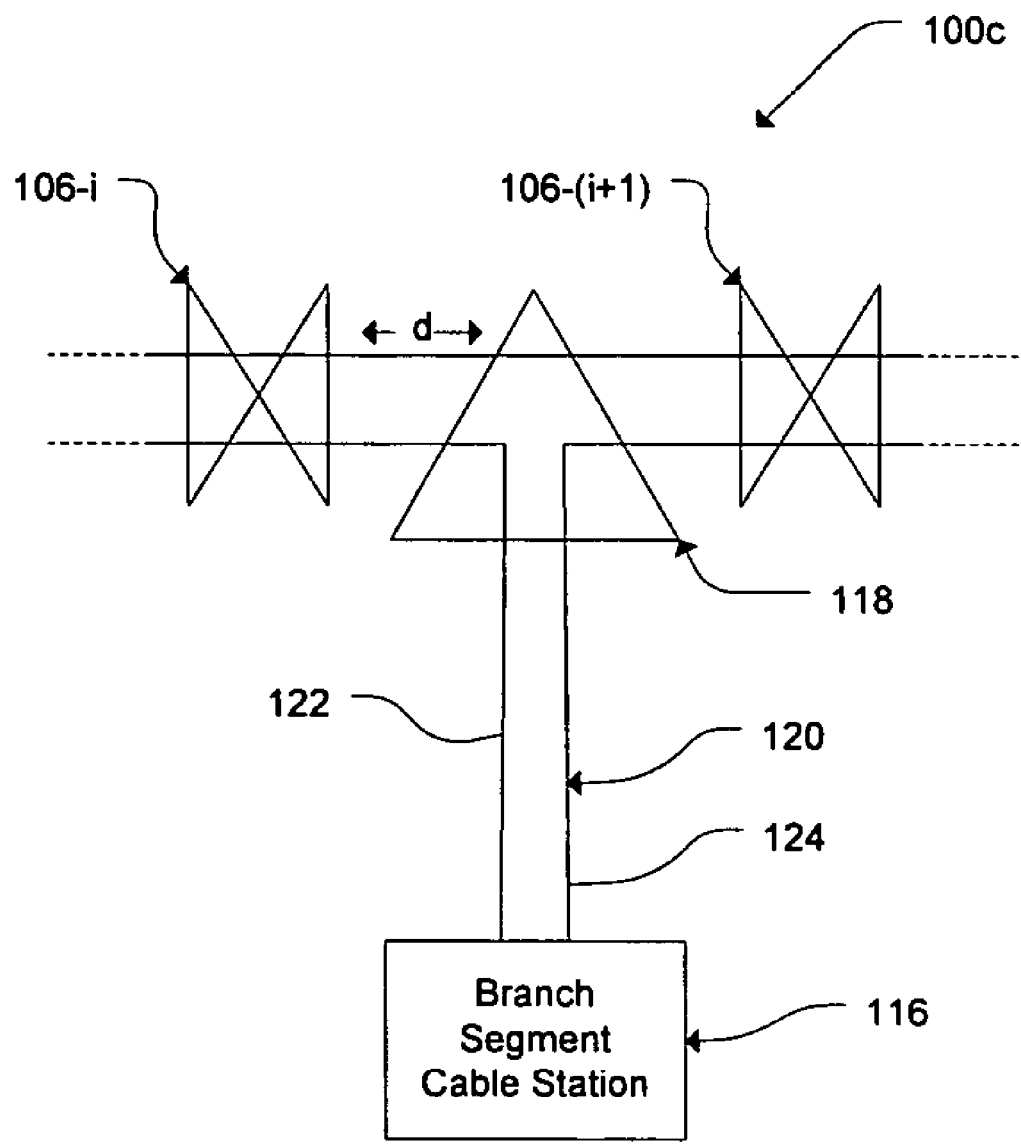
FIG. 4 is a block diagram of another exemplary embodiment of a portion of a system including an unrepeatered branch segment consistent with the present invention.

FIG. 4 illustrates a portion of a system 100*c* consistent with the invention allowing a further increase in the length of the branch segments. In the illustrated exemplary embodiment a branch segment cable station 116 may be coupled to a branching unit 118 through an unrepeatered branch segment 120. The cable station 116 may be configured to include a pump source for establishing Raman amplification in the branch segment and/or a doped fiber segment may be provided in the fiber pairs of the branch segment, as described, for example, in connection with FIGS. 2 and 3. Again, the fiber pairs of the branch segment may carry at least the same channel capacity as the trunk path.

In the illustrated exemplary embodiment, the trunk path repeaters 106-*i*, 106-(i+1) on each side of the branching unit 118 may be placed in close proximity, e.g. within distance d of about 20 km, to the branching unit 118. The repeaters 106-i, 106-(i+1) may also be configured to provide high gain, e.g. about 26 dB, at low input power level, e.g. 100 µW. In one embodiment including a nominal repeater spacing of between 90 km and 100 km, for example, the repeaters 106-i, 106-(i+1) may be configured for maximum gain with available pump power to allow for 120 km spacing to the next trunk path repeater. The length of the branch segment 120 may be increased since in such a configuration the repeaters 106-i, 106-(i+1) may accept lower nominal input power than other repeaters in the trunk path.

In one embodiment, the length of the branch segment 120 in the cable station receive direction may exceed 175 km, even when only Raman amplification (as opposed to both Raman and EDFA amplification) is provided on the branch segment 120 by pump sources at the cable station 116. For the receive direction, the repeaters may be high output power repeaters and the Raman gain established in the branch segment 120 by the pump source in the cable station 116 may exceed about 20 dB. For the transmit direction, i.e. from the cable station 116 to the branching unit 118, the cable station transceiver may include a high power booster (e.g. up to +33 dBm) for transmitting the channels onto the branch segment 120 at a power higher than the transmission power of the trunk path cable stations 104-1, 104-2 (FIG. 1). The high power booster may be combined with Raman amplification (e.g. 6-9 dB) to allow the branch segment 120 in the transmit direction to exceed 175 km, with penalty of only less than about 0.5 dB on the overall optical signal-to-noise ratio.

There is thus provided an undersea optical communication system including a repeatered trunk path and one or more unrepeatered branch segments coupled to the trunk path through associated submarine, i.e. submerged, branching units. Each of the branch segments may be configured to carry at least the same channel capacity as the trunk path and may have a length greater than the average repeater spacing in the trunk path. Cable stations coupled to the branch segments may include pump sources to establish Raman amplification in the branch segments. In addition, or alternatively, the branch segments may include a doped fiber segment pumped by a pump source in the branch segment cable station, e.g. to establish an EDFA in the branch segment. The cable station may also include a transceiver having a high power booster for transmitting channels on the branch segment at high power. The trunk path repeaters may be placed in close proximity to the branching unit to allow further extension of the branch segment length. Extended unrepeatered branch segment length, e.g. of up to three times the average repeater spacing in the trunk path, allows for reduced cost and complexity of optical systems through omission of repeaters in the branch segments and PFE in the branch segment cable stations.

The embodiments that have been described herein but some of the several which utilize this invention and are set forth here by way of illustration but not of limitation. Many other embodiments, which will be readily apparent to those skilled in the art, may be made without departing materially from the spirit and scope of the invention.

What is claimed is:

1. A communication system comprising:
a trunk path configured for communicating a plurality of optical data signals, each at a different associated wavelength, between first and second trunk path cable stations, said trunk path being at least partially submarine and comprising a plurality of repeaters, said repeaters being spaced from each other along said trunk path and being coupled to said trunk path for receiving power from power feed equipment in at least one of said first and second cable stations; and
at least one branch segment configured for communicating signals at one or more of said wavelengths between said trunk path and a branch segment cable station, said branch segment being at least partially submarine and having a first end coupled to said trunk path through a submarine branching unit and a second end coupled to said branch segment cable station, said branch segment cable station having no power feed equipment, and said branch segment having a length greater than an average repeater spacing between said repeaters and having no repeaters disposed along the length thereof;
wherein a first one of said repeaters disposed along said trunk path is adjacent a first side of said branching unit and a second one of said repeaters disposed along said trunk path is adjacent a second side of said branching unit, and said first and second ones of said repeaters are configured for repeater spacing greater than said average repeater spacing:
wherein said first one of said repeaters and said second one of said repeaters are both disposed along said trunk path at a distance of 20 km or less from said branching unit.

2. A system according to claim 1, wherein said branch segment cable station comprises a pump source configured to pump at least a portion of said branch segment to provide Raman amplification to said signals at said wavelengths.

3. A system according to claim 2, wherein said branch segment comprises at least one rare earth doped fiber segment, and wherein said cable station is configured to pump said fiber segment to provide amplification to said signals at said wavelengths.

4. A system according to claim 3, wherein said rare earth doped fiber segment comprises an erbium doped fiber segment.

5. A system according to claim 3, wherein said pump source is configured for pumping said rare earth doped fiber segment.

6. A system according to claim 1, wherein said average repeater spacing is in a range from about 35 km to 120 km.

7. A system according to claim 1, wherein said length of said branch segment is between two and three times said average repeater spacing.

8. A system according to claim 1, wherein said length of said branch segment is greater than 175 km.

9. A system according to claim 1, wherein said branch segment cable station is configured to transmit at a power higher than a transmission power of said first and second trunk path cable stations.

10. A system according to claim 1 wherein said repeaters are spaced according to a nominal repeater spacing.

11. A system according to claim 1 wherein said repeaters are spaced according to a plurality of different repeater spacings.

12. An optical communication system comprising:
a trunk path configured for communicating a plurality of optical data signals, each at a different associated wavelength, between first and second trunk path cable stations, said trunk path being at least partially submarine and comprising a plurality of repeaters, said repeaters being spaced from each other along said trunk path according to a repeater spacing in a range from about 35 km to 120km and being coupled to said trunk path for receiving power from power feed equipment in at least one of said first and second cable stations; and at least one branch segment configured for communicating signals at one or more of said wavelengths between said trunk path and a branch segment cable station, said branch segment being at least partially submarine and having a first end coupled to said trunk path through a submarine branching unit and a second end coupled to said branch segment cable station, said branch segment having a length greater than an average repeater spacing and having no repeaters disposed along the length thereof, said branch segment cable station comprising a pump source configured to pump at least a portion of said branch segment to provide Raman amplification to said signals at said wavelengths, and having no power feed equipment;

wherein a first one of said repeaters disposed along said trunk path is adjacent a first side of said branching unit and a second one of said repeaters disposed along said trunk path is adjacent a second side of said branching unit, and said first and second ones of said repeaters are configured for repeater spacing greater than said average repeater spacing and disposed along said trunk path at a distance of 20 km or less from said branching unit.

13. A system according to claim 12, wherein said length of said branch segment is greater than 175 km.

14. A system according to claim 12, wherein said branch segment cable station is configured to transmit at a power higher than a transmission power of said first and second trunk path cable stations.

15. A system according to claim 12, wherein said branch segment comprises at least one rare earth doped fiber segment, and wherein said cable station is configured to pump said rare earth doped fiber segment to provide amplification to said signals at said wavelengths.

16. A system according to claim 15, wherein said rare earth doped fiber segment comprises an erbium doped fiber segment.

17. A system according to claim 15, wherein said pump source is configured for pumping said rare earth doped fiber segment.

18. A system according to claim 12, wherein said length of said branch segment is between two and three times said average repeater spacing.

19. A method of providing a branch segment in an optical system including a plurality of repeaters disposed along a trunk path, the trunk path being configured for communicating a plurality of optical signals, each at a different associated wavelength, said method comprising:

coupling an unrepeatered branch segment between said trunk path and a branch segment cable station having no power feed equipment, said branch segment having a length greater than an average repeater spacing between said repeaters and being at least partially submarine with a first end coupled to said trunk path through a submarine branching unit and a second end coupled to said branch segment cable station, said branch segment cable station being configured for transmitting and receiving signals at said wavelengths on said branch segment, wherein a first one of said repeaters disposed along said trunk path is adjacent a first side of said branching unit and a second one of said repeaters disposed along said trunk path is adjacent a second side of said branching unit:

configuring said first and second ones of said repeaters for repeater spacing greater than said average repeater spacing:

positioning said first and second ones of said repeaters along said trunk path at a distance of 20 km or less from said branching unit: and pumping said branch segment to provide Raman amplification of said signals at said wavelengths on said branch segment.

20. A method according to claim 19, wherein said length of said branch segment is between two and three times said average repeater spacing.

21. A method according to claim 19, wherein said length of said branch segment is greater than 175 km.

22. A method according to claim 19, wherein said branch segment is pumped by a pump source at said branch segment cable station.

23. A method according to claim 19, wherein said branch segment comprises at least one rare earth doped fiber segment, and wherein said method further comprises pumping said rare earth doped fiber segment to provide amplification to said signals at said wavelengths.

24. A method according to claim 23, wherein said rare earth doped fiber segment comprises an erbium doped fiber segment.

25. A method according to claim 19, wherein said average repeater spacing is in a range from about 35 km to 120 km.

* * * * *